United States Patent [19]

Carroll et al.

[11] Patent Number: 4,510,405

[45] Date of Patent: Apr. 9, 1985

[54] MOTOR LOCK DEVICE

[75] Inventors: Noel Carroll, Sherbrooke; Colin J. Phelps, Fountain Gate, both of Australia

[73] Assignee: Secton Pty. Ltd., Dandenong, Australia

[21] Appl. No.: 386,180

[22] Filed: Jun. 8, 1982

[30] Foreign Application Priority Data

Jun. 12, 1981 [AU] Australia ............................ PE9276
Sep. 30, 1981 [AU] Australia ............................ PF0980

[51] Int. Cl.$^3$ ............................................. H02K 1/10
[52] U.S. Cl. ........................................ 310/76; 310/77; 310/78; 310/41
[58] Field of Search ............................ 310/41, 76–78, 310/37

[56] References Cited

U.S. PATENT DOCUMENTS

| | | | |
|---|---|---|---|
| 3,165,936 | 1/1965 | Daugherty | 310/78 X |
| 3,732,447 | 5/1973 | Perkats | 310/77 X |
| 3,819,966 | 6/1974 | Noguchi | 310/41 X |
| 4,280,073 | 7/1981 | Miller | 310/77 |

Primary Examiner—Donovan F. Duggan

[57] ABSTRACT

An electric motor having an electromagnetically operated clutch automatically engageable to lock the motor shaft against rotation in at least one direction. Embodiments are described in which interruption of the power to the motor causes engagement of the clutch and in which application of power to the motor causes disengagement of the clutch. Also disclosed is an automatic sliding door assembly operated by an electric motor having an electromagnetically operable clutch which is engaged on interruption of power to the motor to lock the motor shaft against rotation in one direction.

4 Claims, 10 Drawing Figures

MOTOR LOCK DEVICE

BACKGROUND OF THE INVENTION

Field of the Invention

This invention relates to motors and has for its object to provide a motor with a lock device for locking the motor output shaft.

BRIEF SUMMARY OF THE INVENTION

In one aspect the invention provides an electric motor having an output shaft carrying thereon a clutch element which is axially movable relative to the shaft but constrained for rotation with the shaft at least when the shaft rotates in one direction, electromagnet means being provided selectively energizable to axially move the clutch element relative to the shaft into or out of engagement with a surface of the motor said engagement locking the shaft against rotation at least in said one direction, and the shaft being free for rotation when the clutch element is out of said engagement with said surface. Preferably, the surface is a fixed surface of the motor extending transverse to the shaft.

The disc may be mounted irrotationally relative to the shaft or may be mounted to the shaft by means of a device permitting the shaft to rotate only in a direction counter to said one direction when the clutch element does not rotate.

In the case where the electromagnet means is selectively energizable to move the clutch element into engagement with said surface, it is preferred that resilient means be provided normally biasing the clutch element away from said surface. In the case where the electromagnet means is selectively energizable to move the clutch element out of said engagement with the surface, it is preferred that resilient means be provided normally biasing the clutch element into engagement with said surface.

In the first-mentioned case, the clutch element may be an annular disc mounted for slidable movement over the shaft and be mounted to a fixed outstanding flange on the shaft by spigots which are carried by the disc and extend parallel to the axis of the shaft from the disc slidably through apertures in the flange, the free ends of the spigots away from the disc and to the side of the flange remote from the disc having sideward projections, the resilient means being in the form of compression springs acting between the projections and the remote side of the flange to bias the disc towards the flange.

Further in accordance with the present invention there is provided a motor having an output shaft, means mounted to the output shaft for rotation therewith and including a part relative to which said shaft is rotatable in one direction only and clutch means selectively engageable and disengageable, said clutch means being arranged so that when engaged it locks said part against rotation whereby said shaft can only rotate in said one direction. An electromagnet may be provided for engaging and/or disengaging the clutch means. The electromagnet may, for example, be arranged to hold said clutch means disengaged when energized or may alternatively be arranged to hold the clutch means engaged when energized. The clutch means may include a clutch plate axially movable along the axis of said shaft and comprising, or being irrotationally mounted relative to the said part of said means mounted to, the output shaft. The electromagnet may include a member irrotational relative to a body of the said motor but axially movable relative to the said shaft under influence of energization of the electromagnet. The said member may, for example, be positioned to bear against the clutch plate under the condition of energization of the electromagnet to press the clutch plate against a fixed part of the said clutch means to effect said locking of said part. Alternatively, resilient means may be provided for resiliently biasing said member against the clutch plate to effect engagement of the clutch means by resiliently biasing the clutch plate against a fixed part of the clutch means, the electromagnet being positioned and arranged so that when energized it effects said disengagement of said clutch means by drawing said member away from the said fixed part of the clutch means against said resilient bias, whereby to release bias pressure between the clutch plate and said fixed part of the clutch.

An electric motor constructed in accordance with the invention may be utilized, for example, in a sliding or other door assembly where the motor normally is operated to provide power assistance to the door. Such arrangements are well known, the motor operating in one direction to open the door and in the opposite direction to close the door. With such arrangements, it is also known to provide a "failsafe" mechanism operable to open the door under the condition of power failure to the motor. Normally, this opening action is not accompanied by any decoupling of the driving connection between the motor and door so that the action of opening the door also causes rotation of the motor shaft. In some instances, it may be desirable, once the failsafe mechanism has so operated, to permit the door to be closed again in a fashion such that it cannot again be reopened until the restoration of power supply to the door. If the motor is formed as described above, with the electromagnet arranged to normally maintain the said part of the said means mounted to the drive shaft free to rotate with the shaft, the motor can operate freely under the condition of normal power supply. However, once power supply is interrupted, the failsafe mechanism will cause the doors to move to the open condition as above described and the interruption of power supply will cause de-energization of the electromagnet thereby bringing about the described locking action to lock the said part of the said means mounted to the drive shaft. Then, by appropriately arranging the direction of permitted rotation of the drive shaft when this lock up occurs it is possible to permit the doors subsequently to be closed manually with accompanying rotation of the motor shaft, but to ensure that the doors cannot thereafter be reopened by virtue of the prevention of rotation of the motor shaft in the opposite direction which then occurs.

Thus, in a more particular aspect, the invention also provides an electrically actuated door assembly having a door mounted for movement between open and closed positions, and mechanism for effecting such movement, said mechanism including a motor having an output shaft, means mounted to the output shaft for rotation therewith and including a part relative to which said shaft is rotatable in one direction only and clutch means selectively engageable and disengageable, said clutch means being arranged so that when engaged it locks said part against rotation whereby said shaft can only rotate in said one direction, said motor having an electromagnet for holding the clutch means disengaged when energized; the electromagnet being coupled so that it is energized under normal operating conditions of the door assembly to permit rotation of the motor shaft in said one direction and in the direction counter to said one direction, said electromagnet been arranged to be de-energized under an emergency condition of interruption of electric supply to the door assembly including the motor; the door assembly further including a stored energy device for moving the door to said open position, if the door is not already so positioned, under said emergency condition; said motor being arranged so that on rotation of the motor shaft in said one direction, the mechanism is operated to move the door to its closed position and so that on rotation of the motor shaft in the direction counter to said one direction the mechanism is operated to move the door to its open position; said assembly being so arranged that, on said interruption of electric supply under said emergency condition, the electromagnet is not operative to prevent said rotation of the motor shaft in said counter direction until the stored energy device has moved the door to its open position, but such that thereafter the said locking occurs whereby, by manual movement of the door under rotation of the motor through the mechanism in said one direction, the door may be moved to said closed position, subsequent movement of the door again to the open position under rotation of the motor through the mechanism in the direction counter to said one direction then being precluded.

BRIEF DESCRIPTION OF THE DRAWINGS

The invention is further described by way of example with reference to the accompanying drawings in which.

DETAILED DESCRIPTION

Figure 1:
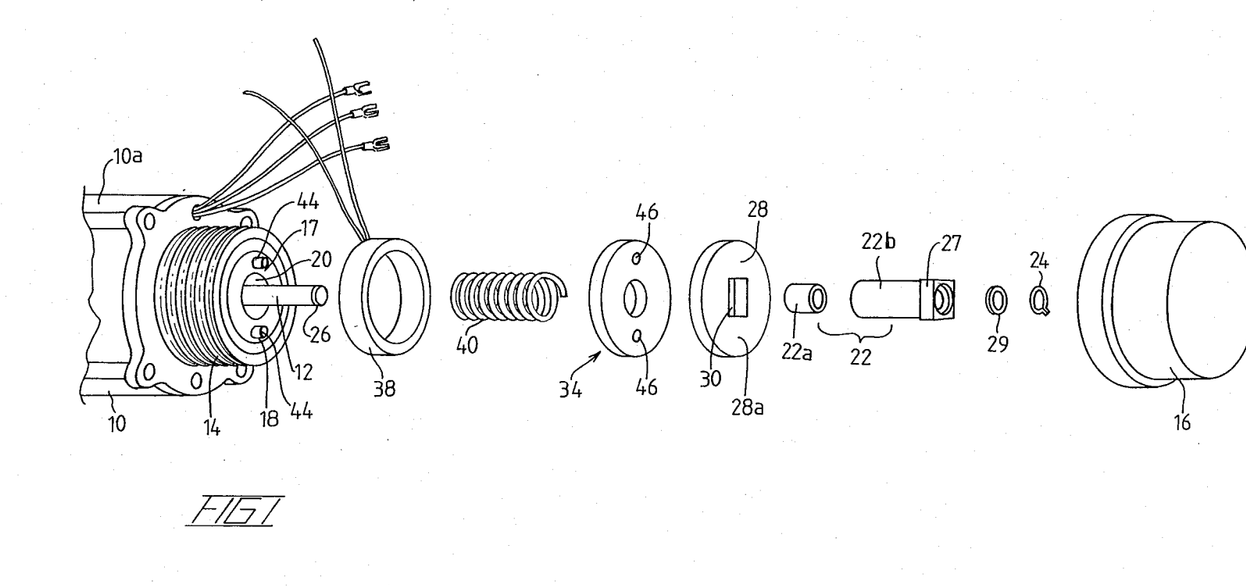
FIG. 1 is an exploded view of one end of a motor constructed in accordance with the invention.
Figure 2:
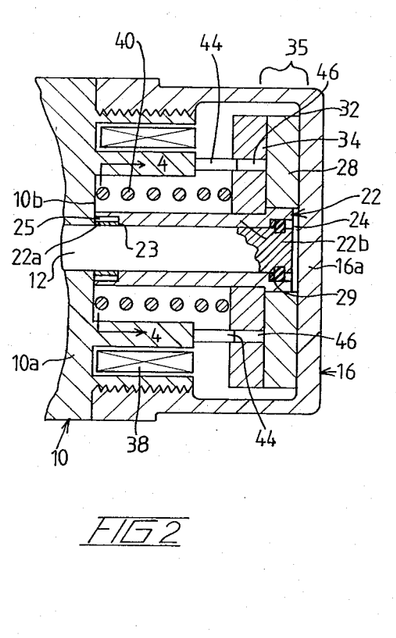
FIG. 2 is a fragmentary cross-section showing the condition of free rotation of the motor drive shaft in the motor of FIG. 1.
Figure 3:
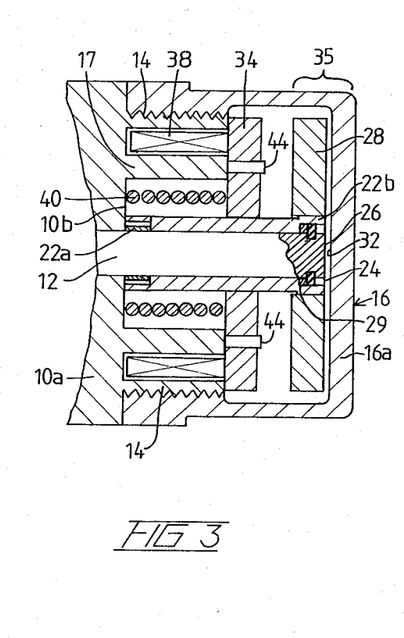
FIG. 3 is a view like FIG. 2 but showing the condition of lock-up of the motor shaft.

The motor 10 shown in FIGS. 1 to 3 is an electric motor having a body 10a and an output shaft 12 extending from one end of the body. An annular skirt 14 is provided on body 10a, this extending in coaxial relationship around shaft 12 and being positioned at one end of the body 10a. Skirt 14 is externally threaded and receives thereon an internally threaded cup shaped end member 16, the latter being tightly threaded onto the skirt 14 to be substantially irrotational relative thereto in use. Also coaxial with shaft 12 is an inner annular skirt 17 which is interposed between shaft 12 and skirt 14 so as to present an annular space 18 between skirts 14 and 17 and an annular space 20 between shaft 12 and skirt 17. Skirt 17 is formed integrally with body 10a.

Figure 4:
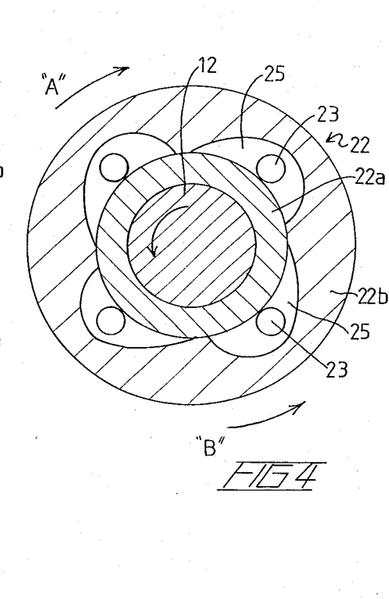
FIG. 4 is an enlarged fragmentary cross-section on the line 4—4 in FIG. 2.

A one-way bearing unit 22 is carried by shaft 12. Bearing unit 22 has an inner part 22a which is irrotationally received on shaft 12 and an outer part 22b which is mounted to part 22a in a fashion such that it can rotate only in one direction relative to part 22a. As shown in FIG. 4 unit 22 may be of conventional form employing rollers 23 received in cavities 25 in an inner bore of the part 22b, which cavities are closed by the outer periphery of part 22a. The cavities 25 are shaped in a tapered fashion so as to trap the rollers during rotation of the outer part 22b in a first direction ("A" in FIG. 4) relative to part 22a, by virtue of a wedging action then occurring between the rollers and opposed surfaces of the cavities and part 22a whereby to lock the two parts together, but such as to permit the rollers to freely move in the cavities under rotation in the opposite direction ("B" in FIG. 4) whereby driving interconnection between the parts 22a, 22b does not prevail. In order to prevent part 22b from moving off the end of the shaft, it is locked in position by use of a circlip 24 received in a groove 26 on the shaft 12, a washer 29 being interposed between the circlip and one end face of part 22b.

Part 22b has an axial end portion 27 thereof furthest away from motor body 10a formed of a non-circular configuration, being square as shown. A circular clutch plate 28 has a central opening 30 which is of square cross-section complementary to the form of end portion 27 of part 22b and fits on end portion 27 so that the clutch plate is irrotational on end portion 27, but still capable of axial movement relative to part 22b. Clutch plate 28 is positioned with its outermost transverse surface 28a directly opposed to the inner face 32 of a transverse end wall 16a of end member 16. This wall 16a, and the plate 28, together form part of a clutch in the sense that, by axial movement of the plate 28 away from body 10a the surface 28a can be brought into engagement with face 32 in such a fashion as to lock the plate 28 to the wall 16a by frictional coupling between face 32 and surface 28a. This clutch is designated generally by reference numeral 35 in FIGS. 2 and 3.

An annular steel or iron plate 34 is coaxially mounted relative to the axis of shaft 12 and is interposed between body 10a and plate 28. The outer diameter of plate 34 is somewhat greater than the outer diameter of skirt 17, whilst the inner diameter of plate 34 is such as to provide clearance with respect to the outer surface of part 22b which is immediately therewithin.

An annular electromagnet coil 38 is positioned within the space 18 between skirts 17 and 14 and is affixed therein. A helical compression spring 40 is positioned within the space 20 and acts against plate 34 and an end surface 10b of body 10a to resiliently bias the plate 34 against plate 28 and thence to resiliently bias the plate 28 into engagement with wall 16a of end member 16 to effect engagement of clutch 35. The plate 34 is, however, movable axially away from wall 16a and against bias of spring 40 under influence of energization of the coil 38 to thereby release pressure on the plate 28 and to disengage clutch 35 by releasing the clutching coupling between the surface 32 and plate 28. In order to minimize wear on plate 34, it is confined against rotation by two spigots 44 which extend from skirt 17 and which are slidably received in complementary apertures 46 in plate 34. Spigots 44 also assist in maintaining axial alignment of the plate 34. By making body 10a of steel or iron the electromagnetic attraction of the plate 34 under energization of the coil 38 is enhanced.

Figure 8:
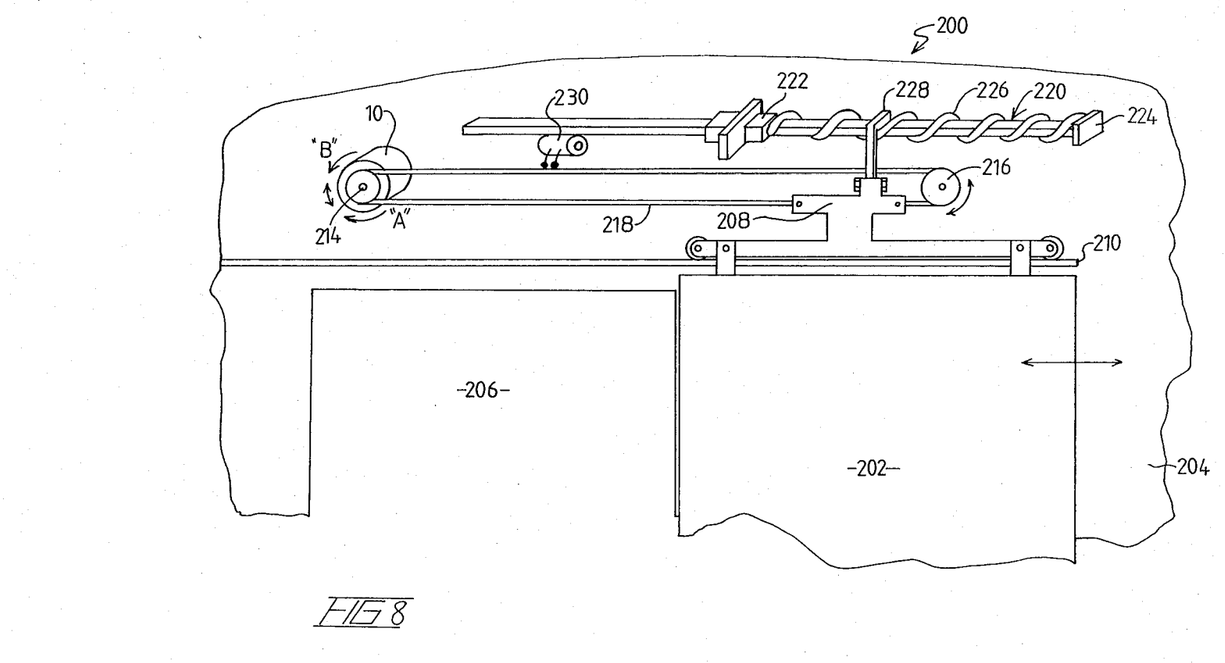
FIG. 8 is a partly diagrammatic perspective view of a sliding door assembly utilizing the motor of FIGS. 1 to 3.

The electric motor 10 is useful, as mentioned above, in sliding door assembly where the motor 10 normally drives the door for opening and closing by operation of the shaft 26 in opposite directions. Such an assembly 200 is shown in FIG. 8. Assembly 200 includes a door 202 supported for sliding movement adjacent to wall 204, between the open position shown, at which access is possible through a doorway 206 in a wall 204, to a closed position (not shown) at which doorway 206 is closed. Door 202 is supported from a wheeled carriage 208 which runs on a track 210 above the doorway 206. The motor 10 previously described is arranged with its output shaft 12 connected to a sprocket 214. A chain 218 is connected to carriage 208 and runs in a loop around sprocket 214 and a further freely rotatable sprocket 216. Sprockets 214, 216 are at opposed ends of track 210 and, by operating motor 10, it is possible to drive chain 218 so that the carriage 208 is moved back and forth along track 210 for opening and closing of door 202. The arrangement is such that closing movements of the door 202 require turning of shaft 12 in the direction "A" in FIGS. 4 and 8 whilst opening movenemts require movement of the shaft 12 in the direction "B" in FIGS. 4 and 8.

The assembly 200 is fitted with a stored energy "failsafe" device generally designated by reference numeral 220. This device may be of the form particularly described in the specification of Australian Pat. No. 467,591 and is shown only diagrammatically in FIG. 8 as having a steel runner member 222 mounted for free sliding movement along a lengthwise extending slide 224 running parallel to track 210. Device 200 further includes a helical tension spring 226 fixed at one end to the end of slide 224 remote from motor 10 and fixed at the other end to runner member 222. The carriage 208 carries an engagement member 228 which is positioned to so engage the runner member 222 during a first closing movement of the door occurring after application of electric supply to the door assembly 200 to carry the runner member with the carriage so that it is moved to be engaged and held by an electromagnet 230 disposed adjacent the motor 10. This movement of the runner member 222 causes tensioning of the spring 226, the spring thence being retained in its tensioned condition by virtue of the holding of the runner member 222. Thereafter, normal operation of the assembly 200 can occur with the motor 10 simply driving the door 202 back and forth without engagement between the members 228 and 222. Under an emergency condition, as next described, the electromagnet 230 is de-energized and the member 222 released whereby, under action of the spring 226 the runner member is moved to the end of the slide 224 remote from motor 10 thereby engaging the member 228 and moving the carriage 208 on track 210 to open the door 202 if the door were not already so positioned.

Figure 9:
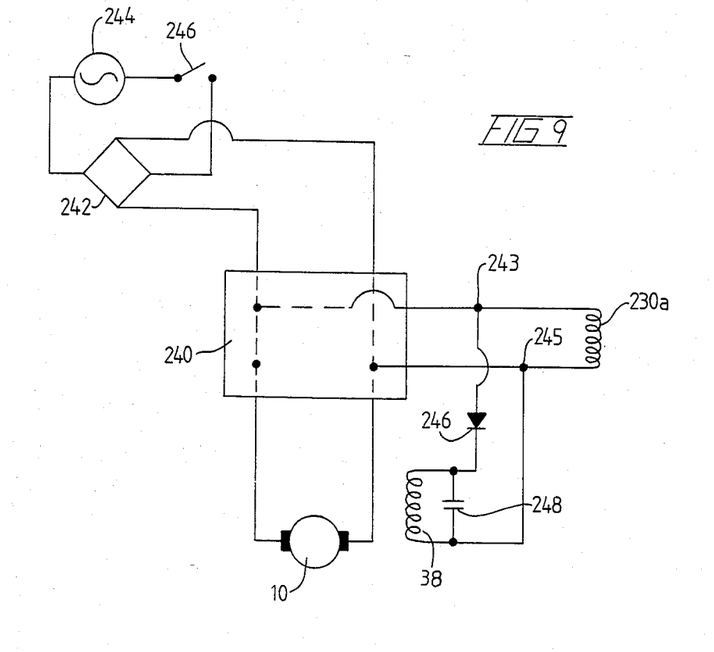
FIG. 9 is a circuit diagram of the electric interconnections of components of the assembly of FIG. 7.

In FIG. 9, a control circuit 240 for controlling motor 10 is shown diagrammatically as being supplied by electric current from a rectifier 242 supplied from an alternating current supply 244, when a main control switch 246 is closed. Circuit 240 is of conventional form being, for example, operable to move the door 202 between open and closed positions in response to control signals generated therein. For example, as is well known, the door assembly may be provided with a sensor for detecting approach of a person to the door 202 to condition the control circuit 240 so that the motor 10 is operated first to open the door and thence to close the door after passage of a person through the door.

The electric winding 230a of the electromagnet 230 is so connected to control circuit 240 that it receives electric supply from rectifier 242 whenever switch 246 is closed and supply to 244 is operating. That is to say whenever the door is conditioned so that the motor 10 is capable of being operated from the control circuit 240, then the winding 230a is energized. On interruption of supply to the control circuit 240 such as by opening of switch 246, or more particularly under an emergency condition where supply 244 is interrupted, the winding 230a is de-energized whereby to effect the aforementioned release of the member 222 and thus to effect operation of the failsafe device 220. On restoration of power, the winding 230a is again energized whereby, on a first occurring closing movement of the door after the emergency condition has been rectified, loading of the failsafe device will occur as described.

The coil 38 of motor 10 is also arranged to be operated and energized whenever the supply 244 is effective to apply electric potential via rectifier 242 to circuit 240. As shown, for example, coil 38 may be connected for energization via a diode 246 from the same points 243, 245 of current supply from circuit 240 as winding 230a. However, a capacitor 248 is connected across coil 238 so that in the event of interruption of supply to the aforementioned supply points for the coil 38 and winding 230a, the coil 38 remains energized for a short period after such interruption, being supplied by stored energy from the capacitor 248. However, the winding 230a is more or less immediately de-energized following such interruption, the diode 246 serving to prevent backfeed of current from the capacitor 248 to the winding 230a.

It will be appreciated that, when the coil 38 is energized, the shaft 12 of motor 10 can as previously described, rotate freely either in the direction "A" or the direction "B" shown in FIG. 8. However, on de-energization of coil 38, shaft 12 can rotate only in the direction "B" shown in FIG. 8, that is to say only in a direction corresponding to the direction for closing movement of the door 202. Thus, if coil 38 were de-energized immediately on supply interruption, it is likely that the clutch 35 of the motor 10 would operate to lock up the shaft 12 against rotation in the direction "B" before the failsafe device 220 had been effective to open the door 202. In such a case, the door 202 may not complete an opening movement. However, the capacitor 248 is made of sufficient size so that the coil 38 remains energized for a sufficient period to enable the failsafe device 220 to move the door 202 to its fully open position. In practice, it is usually sufficient to size capacitor 248 such as to give about four seconds continued energization after supply interruption.

After such operation of the failsafe device and movement of the door 202 to its open position, the capacitor 248 is discharged to a sufficiently low level so that the clutch 35 of the motor 10 operates to prevent further rotation of the shaft 12 in the direction "B" of FIG. 8. Then, although the door 202 can subsequently be closed, such as by manually moving the door 202 so that the chain 208 is moved around its loop and the sprocket 214 is turned to turn shaft 12 in direction "A", re-opening of the door 202 cannot occur until reinstatement of electric supply and subsequent re-energization of the coil 38. That is to say, any such opening movement would require movement of chain 218 in the direction tending to cause shaft 12 to turn in the direction "B", which as described is then precluded.

The above arrangement has the particular advantage in that it ensures that, while the failsafe device 220 can always safely operate on interruption of electric supply to open the door 202, whereby to prevent persons who might otherwise come, for example, to be trapped, to pass through the doorway 206, it is still possible, after all persons affected have been safely cleared through the doorway 206 for a person such as a supervisor in charge of the door to subsequently close the door 202 to prevent further access through the doorway. This is particularly important in, for example, cases where the doorway 206 is an exterior doorway to a public building where, whilst it is important to permit persons to be able to surely leave the building in the event of an emergency involving power failure, it may be undesirable to thereafter leave the door open for possible unauthorized access by persons later, and before reinstatement of supply permits the door to return to normal functioning.

Figure 10:
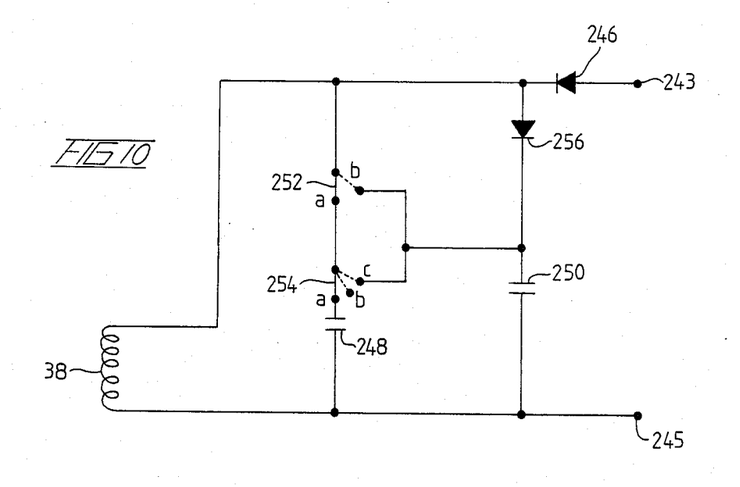
FIG. 10 is a circuit diagram showing a modification to the circuit diagram of FIG. 8.

FIG. 10 shows a modification where in addition to the capacitor 248, a second capacitor 250 is provided. Here, the diode 246 is connected between the supply point 243 and one end of the coil 38, as previously described. However, the capacitor 248 instead of being directly connected across the coil 38 is connected thereacross via two series connected switches 252, 254. When the switches 252 are in the switch positions "a" shown, the capacitor 248 can charge via diode 246 for operation of the capacitor 248 exactly in the manner previously described. That is to say under interruption of supply, the coil 38 will be energized from the capacitor 248 for a period of time for the purpose mentioned.

Capacitor 250 is connected in series with a diode 256 and the series circuit comprising the diode and capacitor are connected together across coil 38. The arrangement is such that under normal conditions, capacitor 250 charges via diode 246 and diode 256. Under the condition described where switches 252, 254 are at the positions "a", the capacitor 250, although charged, plays no part in the operation of the electric circuit, being isolated from discharge by the diode 256. Switch 252 does, however, have a position "b" at which the diode 256 is short circuited and at the same time the capacitor 248 is isolated from coupling across the coil 38. Under this condition the capacitor 250 can discharge through the coil 38. Thus, in the event of power interruption with switches 252, 254 at the "a" position and where the failsafe device has operated as described, accompanied by discharge of the capacitor 248, and where thereafter, the door 202 is moved to the closed position, it would still be possible, by movement of the switch 252 to its "b" position, to energize the coil 38 from the capacitor 250 to release clutch 35 for a time period sufficient to enable a person to thereafter again open the door 202 such as manually.

Switch 254 has two further positions "b" and "c". At position "b", capacitor 248 is isolated from discharge independent of whether switch 252 is in position "a" or position "b". When the switch 254 is in the position "b", operation of the failsafe mechanism under emergency condition is inhibited. At the position "c" of switch 254, capacitor 248 is again isolated and a discharge path for capacitor 250 to coil 38 is established via switch 254 and via switch 252, when the switch 252 is at the position "a".

The arrangement of FIG. 10 is envisaged as being applicable, for example, where the door assembly 200 is used to control access through an exterior door to a building. The switch 252 could, in that case, be provided on the interior of the building, such as adjacent doorway 206 and be of a kind readily hand operable by persons inside the building. The switch 254 would be positioned either outside the building or in a location accessible only to authorized persons. More particularly, the switch 254 would normally be a key actuated switch which could only be manipulated by a person having a key. It should be noted that even though a caretaker or otherwise authorized person having a key for switch 254 is capable of conditioning the switch 254 to conditions at which the door assembly 200 in its operation are effected in different ways. It is always possible, on power interruption occurring, for a person at the inside of the door to effect a manual opening of the door provided one of the capacitors 248, 250 is charged. Thus, even if switch 254 is conditioned by the authorized person so that the failsafe device 220 does not operate, that is to say if switch 254 is at the position "b", a person inside the building can nevertheless condition the door to permit it to be manually opened by moving the switch 252 to the position "b" to supply coil 38 via capacitor 250. Of course, if the switch 252 were already at position "b" prior to an interruption of supply, the failsafe mechanism would forthwith operate to effect door opening on power interruption, coil 38 being held energized from capacitor 250 for a period after interruption.

On the other hand, a caretaker of the building can use the switch 254 firstly to condition the door to inhibit operation of the failsafe mechanism as described, i.e. positioning it at position "b", or can use the switch to effect subsequent openings of the door even after operation of the failsafe mechanism and any subsequent closing of the door which might occur in the meantime. Thus, assuming the switch 252 to be in position "a", the failsafe device to have operated, and the door to have been subsequently closed manually, turning the switch 254 to position "c" will energize the coil 38 from the capacitor 250 period sufficient to enable a manual opening of the door to be effected. The number of times for which the door may be so opened after operation of the failsafe mechanism accompanied by discharge of capacitor 248 is of course determined by the size of capacitor 250, but generally speaking it is possible to make the capacitor large enough to effect at least two or three such operations if the switch 254 is moved back to the position "b" immediately after each such opening.

The motor of FIGS. 1 to 4 is one in which power interruption to the coil 38 causes lock up of the motor shaft to prevent rotation in one direction. Of course, it would be possible to arrange the motor so that energization of the coil 38 brough about lock up. This could be effected by, for example, positioning the spring 40 to normally bias the plate 28 away from the wall 16a and to position the coil 38 so that operation thereof attracts the plate 34 in a direction towards the wall 16a.

Figure 5:
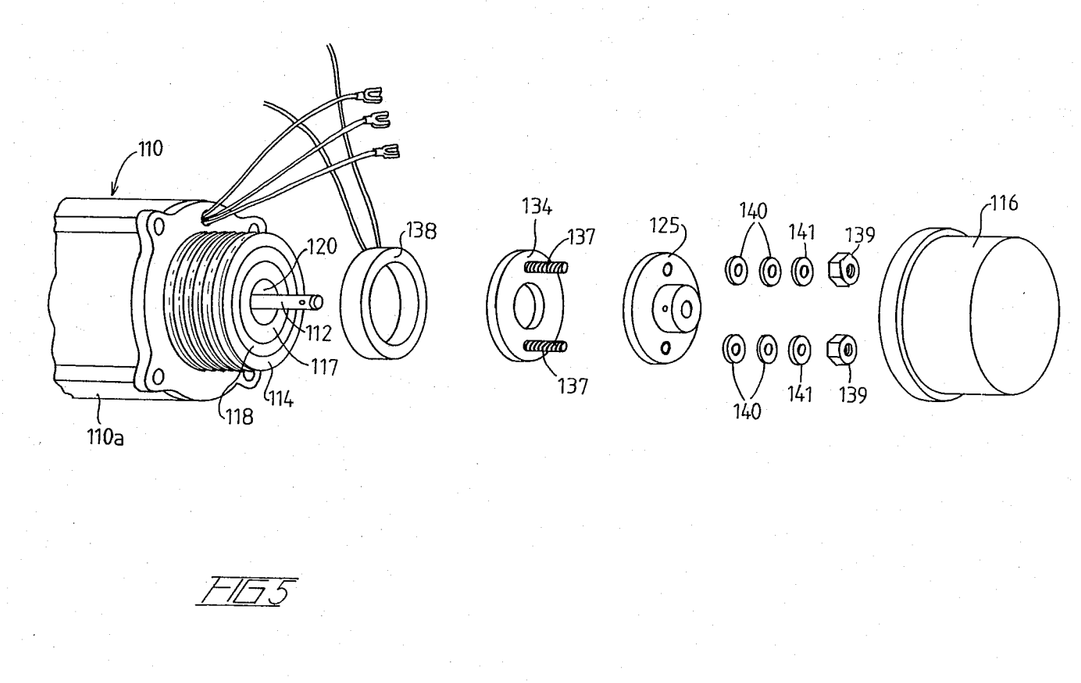
FIG. 5 is an exploded view of one end of an alternative form of motor constructed in accordance with the invention.
Figure 6:
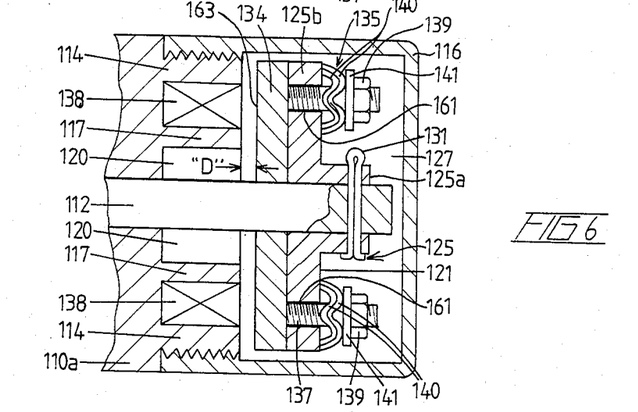
FIGS. 6 and 7 are views like FIGS. 2 and 3 respectively but illustrating the manner of operation of the motor of FIG. 5.
Figure 7:
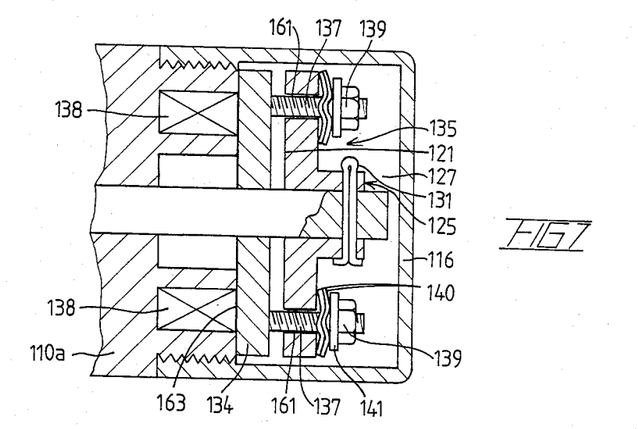

The motor 110 shown in FIGS. 5 to 7 is an electric motor having a body 110a and an output shaft 112 extending from one end of the body. An annular skirt 114 is provided on body 110a, this extending in coaxial relationship around shaft 112 and being positioned at one end of the body 110a. Skirt 114 is externally threaded and receives thereon an internally threaded cup shaped end member 116 the latter being tightly threaded on to the skirt 114 to be substantially irrotational relative thereto in use. Also coaxial with shaft 112 is an inner annular skirt 117 which is interposed between shaft 112 and skirt 114 so as to present an annular space 118 between skirts 114 and 117 and an annular space 120 between shaft 112 and skirt 117. Skirt 117 is formed integrally with body 110a. An annular electromagnet coil 138 is positioned within space 118 between skirts 117 and 114 and is affixed therein.

End member 116 defines therewithin a space 127 (FIGS. 6 and 7) within which are housed components of a clutch mechanism 135. Mechanism 135 includes an annular member 125 having an axial boss 125a and an outstanding peripheral flange 125b. Member 125 is affixed to shaft 112 for rotation therewith, the shaft extending through a central opening in the member and the member being locked in position by a roll pin 131 extending through aligned diametral openings in boss 125a and shaft 112. Flange 125b presents a generally planar end surface 121 which extends transversely of the axis of shaft 112 and which faces the end of body 110a. Between the end of the body 110a and surface 121 there is interposed an annular disc 134 which is slidably mounted on shaft 112 so as to be movable thereon between the two positions shown in FIGS. 6 and 7. Disc 134 is mounted for rotation together with shaft 112, being provided with two diametrally opposed spigots 137, which spigots extend from the disc in directions parallel to the axis of shaft 112 and through aligned openings 161 in flange 125b of member 125. Spigots 137 are threaded and the ends thereof which extend through the flange 125b to the side of the flange opposite disc 134 have locknuts 139 threadedly engaged thereon. Interposed between the locknuts 139 and the flange 125b there are provided, on each spigot 137, a plane washer 141 adjacent the respective nut 139 and two wave washers 140 between the respective washer 141 and flange 125b.

Normally, the wave washers 140, bearing on the one hand against the flange 125b and on the other hand against the washers 141, bias the spigots 137 and the disc 134 to an extreme right hand position shown in FIG. 6 at which disc 134 abuts flange 125b. In this condition, there is a small gap designated "D" in FIG. 6 between the face 163 of disc 134 closest to the end of motor body 110a and the motor body end. Thus, during operation of the motor to turn shaft 112, the clutch mechanism 135 normally has no effect, the disc 134 and member 125 simply turning with the shaft 112. However, by energizing coil 138, the disc 134, which is made of magnetically attractable material such as soft iron, is attracted to the left as viewed in FIGS. 6 and 7 to assume the position shown in FIG. 7 at which the face 163 abuts against the end of the motor body 110a. In this condition there is a frictional engagement between the motor body 110a and the disc 134 which acts to tightly lock the shaft 112 against rotation. The locking actuation of the disc 134 described above is accompanied by compression of the wave washers 140 between the washers 141 and the flange 125b so that on de-energization of coil 138 the wave washers apply a resilient bias against the washers 141 to revert the disc 134 to the position shown in FIG. 6, thus releasing the locking of the shaft 112.

We claim:

1. An electric motor having a locking device for an output shaft, said locking device comprising a clutch element mounted to the output shaft by means permitting the clutch element to move axially relative to the shaft whilst constraining the clutch element to rotate with the shaft when the shaft rotates in one direction but permitting the shaft to rotate freely relative to the clutch element when the shaft rotates in the other direction, resilient means axially biasing the clutch element to engage a surface of the motor to lock the clutch element against rotation thereby preventing rotation of the shaft in said one direction whilst permitting rotation thereof in said other direction and electromagnet means selectively energizable to axially move the clutch element relative to the shaft whereby to disengage the clutch element from said surface of the motor whereby to permit free rotation of said shaft.

2. An electric motor as claimed in claim 1 wherein said surface is a fixed surface of the motor extending transversely of said shaft.

3. An electric motor as claimed in claim 1 wherein said resilient means acts axially against an intermediate member positioned between the resilient means and said clutch element whereby the clutch element is biased into engagement with said surface by engagement by said intermediate member.

4. An electric motor as claimed in claim 2 wherein said resilient means is a resilient compression spring, said intermediate member and said clutch element being of disc like form and the intermediate member being constrained against rotational movement.

* * * * *